United States Patent [19]

Caulfield et al.

[11] Patent Number: 5,071,569

[45] Date of Patent: Dec. 10, 1991

[54] METHOD AND COMPOSITION FOR WATER TREATMENT

[75] Inventors: Paul R. Caulfield; James R. Schueneman, both of Wadsworth, Ill.

[73] Assignee: Coral International, Inc., Waukegan, Ill.

[21] Appl. No.: 497,261

[22] Filed: Mar. 22, 1990

[51] Int. Cl.$^5$ .................................................. C02F 1/76
[52] U.S. Cl. ..................................... 210/754; 210/764; 210/765; 210/917
[58] Field of Search ............... 210/696, 698, 754, 757, 210/764, 765, 917; 134/22.16, 22.19, 28

[56] References Cited

U.S. PATENT DOCUMENTS

| | | | |
|---|---|---|---|
| 3,201,311 | 8/1965 | Antonides et al. | 167/22 |
| 4,108,790 | 8/1978 | Foroulis | 252/175 |
| 4,353,866 | 10/1982 | Wong | 422/37 |
| 4,596,891 | 6/1986 | van Gilse et al. | 564/307 |
| 4,614,595 | 9/1986 | Azzarella et al. | 210/754 |
| 4,846,979 | 7/1989 | Hamilton | 210/754 |

FOREIGN PATENT DOCUMENTS

| | | | |
|---|---|---|---|
| 2011920 | 3/1970 | France | 210/764 |
| 46-27835 | 8/1971 | Japan | 210/764 |
| 1281545 | 7/1972 | United Kingdom | 210/764 |
| 2197861 | 6/1988 | United Kingdom | 210/764 |

OTHER PUBLICATIONS

T. A. Wojtowicz et al., "Water (treatment of Pools, Spas, Hot Tubs")" in Kirk-Othmer *Encyclopedia of Chemical Technology (3rd ed.)*, vol. 24, pp. 427–441 (1984).

*Primary Examiner*—Stanley S. Silverman
*Assistant Examiner*—Krisanne Shideler
*Attorney, Agent, or Firm*—Lydig, Voit & Mayer

[57] ABSTRACT

A method is disclosed for decolorizing a water body particularly for clarifying the water and removing algae stains in a swimming pool, by establishing in the water body EDTA compound and ammonium ions by the addition of appropriate compounds, and a composition for decolorizing such a water body containing EDTA compound and ammonium salt.

14 Claims, No Drawings

METHOD AND COMPOSITION FOR WATER TREATMENT

This invention relates generally to an improved method and composition of water treatment to effect decolorization of color bodies in the water and on the sides and bottom of the water body and, more particularly, to an improved method and composition for the treatment of swimming pools to clarify the water and remove algae stains from the walls and bottoms of swimming pools.

BACKGROUND OF THE INVENTION

Stored bodies of water, for example swimming pools, unless cared for in accordance with strict regiments, act as breeding grounds for various types of algae which grow in the water and on the sides and bottom of the water body. Algae known as green algae and yellow or mustard algae are particularly troublesome in swimming pools.

Green algae are typically waterborne algae. Once established in pool water green algae are difficult to eradicate other than by shocking the pool with massive doses of chlorine. In most instances this practice is effective on green algae, but takes an inordinate length of time, e.g., 72 hours to clear the water.

Yellow algae grows principally on the walls of the pool and appears as a yellow-brown stain. Yellow algae are not removed by shocking the pool, and once a pool becomes infested the most effective and usual way to eliminate yellow algae is to drain the pool and manually scrub the algae from the wall surfaces. This is time consuming and expensive.

Many agents have been proposed and used for the treatment of stored water bodies such as ponds, lakes, reservoirs, storage tanks, cooling systems, spray ponds, swimming pools, and the like. However, many of these agents are harmful or undesirable to humans. Others, when added, while effectively acting as bacteriostatic, algaestatic, and slime-control agents, have not functioned to decolorize and/or eliminate green and yellow algae once they have become established.

U.S. Pat. No. 4,614,595 discloses a method for clarifying bodies of water and removing staining from the containers thereof, particularly swimming pools, by the addition of a source of ammonium ion and a source of chlorine ion and/or bromine ion. More particularly, the patent discloses a method of treating swimming pools to decolorize algae and to remove undesired stains caused thereby by establishing in the pool water a concentration of chloramines or bromamines sufficient to decolorize the algae by adding to the pool water between about 2 and about 10 ppm ammonium ions and between about 2.75 and about 24.44 ppm chlorine and/or bromine ions, the level of addition of these ions to the pool water being selected to cause the free available chlorine and/or bromine content of the pool water to be substantially depleted. Decolorization typically occurs within a matter of hours and is completed within 24 hours, after which the water is preferably standardized.

BRIEF SUMMARY OF THE INVENTION

A principal object of the present invention is the provision of an improved method and composition to decolorize water bodies.

Another object of this invention is the provision of an improved method and composition for clarifying dull and cloudy water contaminated with green algae and removing yellow algae stains from the sides and bottoms of water bodies.

A further object of this invention is the provision of an improved method and composition for cleaning swimming pools of green and yellow algae in less time and with reduced material and effort.

Yet another object of this invention is the provision of an improved method and composition for cleaning swimming pools of green and yellow algae without the need to drain or restandardize the pool.

Still other objects and advantages of this invention will be apparent from the following description.

The present invention involves the discovery that conventional methods and compositions of decolorizing water bodies and, in particular, clarifying water and removing algae stains from swimming pools may be improved such that the resulting water has a higher degree of clarity and the algae stains are removed with less time and effort.

The method of the present invention comprises establishing in a water body sufficient concentrations of EDTA compound and ammonium ions to effect decolorization. The proper concentrations of EDTA compound and ammonium ions may be established in any suitable way but are preferably established in the water body to be treated through use of the composition of the present invention which comprises EDTA compound and ammonium salt. Use of the present inventive method and composition on a water body, such as that of a swimming pool, containing dull and cloudy water contaminated with waterborne green algae and having yellow algae stained sides and bottom results in crystal clear water with simple filtering of solid contaminants and in the removal of algae stains with relatively easy scrubbing. Moreover, swimming pools treated with the method and composition of the present invention do not need to be drained nor restandardized following treatment.

DETAILED DESCRIPTION OF THE INVENTION

While the invention will be described in connection with certain preferred embodiments, there is no intent to limit the invention to the particular embodiments. On the contrary, the invention is intended to encompass all alternative, modified, and equivalent compositions and methods as may be included within the spirit and scope of the invention as defined by the appended claims.

The present invention constitutes a method and composition to decolorize water bodies and, in particular, swimming pools with dull and cloudy water containing green algae and yellow algae stains on the walls and bottoms.

The present inventive method for the decolorization of water bodies comprises establishing in the water body a concentration of EDTA compound of at least about 0.15 ppm and a concentration of ammonium ions up to about 2 ppm. Preferably, the water body is treated by establishing therein an EDTA compound concentration of about 0.2–1.0 ppm and an ammonium ion concentration of about 0.4–2 ppm, and, most preferably, the water body is treated to contain about 0.3–0.6 ppm EDTA compound and about 0.5–1.1 ppm ammonium ion. Any suitable source of EDTA compound and ammonium ions may be used, such as water-soluble EDTA and its salts and ammonium salts. A preferred source of EDTA compound and ammonium ions is the present inventive composition described herein.

The present inventive composition for the decolorization of water bodies comprises (a) at least about 4 wt.% EDTA compound and (b) about 96 wt.% or less ammonium salt. The composition preferably comprises about 5-20 wt.% EDTA compound and about 80-95 wt.% ammonium salt, and most preferably comprises about 10 wt.% EDTA compound and about 90 wt.% ammonium salt.

Approximately a half pound to two pounds (i.e., about 8-32 ounces) of the composition is generally sufficient to treat 20,000 gallons of water, the volume of a typical swimming pool, and two-thirds pound (i.e., about 10-11 ounces) of the composition is preferably so used. Too little composition or much less than the recited component concentrations in the water results in ineffective decolorization, while too much of the composition or much more than the recited component concentrations in the water may cause hazardous conditions and the formation of undesired and possibly harmful compounds. In particular, too high component levels in a swimming pool, particularly of the ammonium ions, results in the depletion of free available chlorine through the reaction of ammonium and chlorine to form chloramines and necessitates restandardization of the pool to restore the free available chlorine and other chemicals to the desired level.

In treating swimming pools, the present inventive method and composition are used in conjunction with typical pool maintenance procedures and are preferably applied to swimming pools which contain water having a pH of about 7.7-8.2 and a chlorine concentration above about 0.5 ppm.

Any suitable EDTA compound and ammonium salt may be used in the present inventive method and composition which is soluble in water. The EDTA compound is preferably selected from the group consisting of EDTA, disodium EDTA, calcium disodium EDTA, trisodium EDTA, tetrasodium EDTA, and mixtures thereof and is most preferably ethylenediaminetetracetic acid, disodium salt dihydrate, also known as disodium EDTA or disodium edetate. The ammonium salt is preferably selected from the group consisting of ammonium hydroxide, ammonium chloride, ammonium sulfate, and mixtures thereof and is most preferably ammonium sulfate. Although EDTA, neutral and alkaline EDTA salts, and ammonium hydroxide may be used in the present inventive method and composition, the use of these compounds may cause the evolution of ammonia vapors which may be undesirable to certain users and in some applications.

The method and composition of the present invention may also involve the use of other components, such as fillers, carriers, and dyes.

The method and composition of the present invention may be used to decolorize any type of water body by clarifying the water and removing algae stains from the sides and bottom thereof. The present inventive method and composition are particularly useful in decolorizing swimming pools in conjunction with typical pool maintenance procedures by clarifying, with filtering, dull and cloudy swimming pool water contaminated with waterborne green algae and removing, with scrubbing, yellow algae stains on the walls and bottoms of swimming pools.

The method and composition of the present invention are used to clarify dull and cloudy water contaminated with green algae and remove yellow algae stains from the sides and bottoms of water bodies in conjunction with filtering and scrubbing. The proper concentrations of EDTA compound and ammonium ions are established in the water in accordance with the present inventive method by any suitable means such as through addition to the water of a proper quantity of the present inventive composition. The water is preferably mixed or agitated to ensure dispersion of the EDTA compound and ammonium ions in the treated water. After the EDTA compound and ammonium ions have had a sufficient opportunity to come into contact with the yellow algae stains to render the stains easily removable, the sides and bottoms of the water body are scrubbed with any suitable device to easily remove the yellow algae stains. After the yellow algae stains have been removed from the water body and the EDTA compound and ammonium ions have acted upon the waterborne green algae, the water is filtered in any suitable manner to remove solid contaminants. The filtering is preferably commenced with, or a short time subsequent to, establishment of the proper concentrations of EDTA compound and ammonium ions in the water in accordance with the present inventive method or the addition of the present inventive composition to the water and continues during the scrubbing of the yellow algae stains and action upon the waterborne green algae.

The time to clarify the water and remove the algae stains of a water body treated in accordance with the present invention is dependent on the initial clarity of the water, extent of algae contamination, severity of algae stains, the adequacy of the agitation during treatment, and efficacy of the water filtering. The treated water body should generally have a temperature between about 65° F. and 110° F. At higher temperatures the clarification of water and removal of algae stains occurs more rapidly; however, excessive temperatures may cause evolution of ammonia.

Swimming pools generally circulate the water contained therein by means of a pump through a filter as a part of their normal operation, thereby providing agitation and filtering of the water. After establishment of the proper concentrations of EDTA compound and ammonium ions in accordance with the present inventive method in, or application of the present inventive composition to, a typical 20,000 gallon capacity swimming pool with normal water circulation, yellow algae stains are removed with easy scrubbing within about 4 hours, and the waterborne green algae are acted upon within about 24 hours. The water of a typical swimming pool is fully filtered within 24 hours, and, therefore, treatment of a typical swimming pool with the method and composition of the present invention generally results in crystal clear water within about 24 hours of the commencement of treatment Water bodies which have been treated with the composition and method of the present invention are devoid of algae contamination, and the water so treated is clean in appearance.

The free available chlorine, pH, alkalinity, and cyanuric acid concentrations in treated swimming pools are generally not effected by use of the method or composition of the present invention, thereby avoiding the need to restandardize the pool after decolorization.

The following examples further illustrate the present invention but, of course, should not be construed as in any way limiting its scope.

EXAMPLE 1

This Example illustrates a composition of the present invention.

A composition of the present invention was prepared by mixing 0.1 lb. of disodium EDTA (of 99% minimum assay) and 1.9 lb. of ammonium sulfate (technical grade of 99% minimum assay).

The resulting 2 lbs. of composition contained 5 wt.% disodium EDTA and 95 wt.% ammonium sulfate.

EXAMPLE 2

This Example illustrates the present inventive composition in its preferred embodiment.

The preferred composition of the present invention was prepared by mixing 0.2 lb. of disodium EDTA (of 99% minimum assay) and 1.8 lb. of ammonium sulfate (technical grade of 99% minimum assay).

The resulting 2 lbs. of composition contained 10 wt.% disodium EDTA and 90 wt.% ammonium sulfate.

EXAMPLE 3

This Example illustrates the use of the present inventive method and composition to decolorize water bodies.

A swimming pool containing about 20,000 gallons of water was to be cleaned. The pool was stained with yellow algae along the walls and bottom of the pool, and the pool water was dull and cloudy in appearance as the result of waterborne green algae. The water of the swimming pool had a pH of about 7.7-8.2 and a chlorine concentration above about 0.5 ppm.

The circulating pump and filter for the pool was turned on. Approximately one-third of the 2 lbs. (i.e., about two-thirds pound) of composition of Example 2 was then added to the swimming pool. As a result, the swimming pool water contained about 0.4 ppm EDTA compound and about 1.0 ppm ammonium ions.

After about 4 hours had elapsed, the pool walls and bottom were scrubbed with a typical pool scrubber, and the yellow algae stains on the pool walls and bottom were thereby easily removed. The circulating pump and filter for the pool continued to operate, and within 24 hours the pool water was fully clarified of the waterborne green algae. There was no need to drain or restandardized the pool which was ready for immediate use.

EXAMPLE 4

This Example illustrates the improved water clarity and reduced amount of scrubbing effort to remove algae stains associated with the use of the present inventive method and composition as compared to other compositions.

The following compositions were prepared comprising the indicated percentages of sodium bromide, disodium EDTA, and ammonium sulfate.

| Composition | Sodium Bromide | Disodium EDTA | Ammonium Sulfate |
| --- | --- | --- | --- |
| A | — | 5 wt. % | 95 wt. % |
| B | — | 10 wt. % | 90 wt. % |
| C | — | 15 wt. % | 85 wt. % |
| D | — | 20 wt. % | 80 wt. % |
| E | 94 wt. % | 6 wt. % | — |
| F | — | — | 100 wt. % |

Compositions A and B were the present inventive compositions of Examples 1 and 2, respectively. Compositions C and D constituted present inventive compositions similar to compositions A and B, except that the disodium EDTA concentration was increased to 15 wt.% and 20 wt.%, respectively, with the remainder of the compositions being ammonium sulfate. Compositions E and F represented conventional swimming pool cleaning compositions.

These six compositions were evaluated with respect to their abilities to remove yellow algae stains from the walls and bottoms of swimming pools within 4 hours of application followed by scrubbing with a typical pool scrubber and to clarify dull and cloudy swimming pool water contaminated with green algae within 24 hours of application with normal filtering.

About two-thirds pound of the various compositions were added to typical swimming pools containing about 20,000 gallons of water having a pH of about 7.7-8.2 and a chlorine concentration above about 0.5 ppm and which contained dull and cloudy water as a result of green algae contamination and which were stained with yellow algae along the walls and bottoms of the pools.

The results of the evaluation revealed that present inventive compositions B, C, and D allowed for the easiest removal of the algae stains and provided the most clear water in the swimming pools. Present inventive composition A allowed for the removal of algae stains and provided clear water in the swimming pool but may have required additional effort in scrubbing as compared to present inventive compositions B, C, and D. All of the evaluated present inventive compositions provided for easier algae stain removal and water clarification as compared to conventional composition E and even more so as compared to conventional composition F. Indeed, the use of conventional composition F did not allow for the removal of algae stains even with strenuous scrubbing, but rather required about two pounds (i.e., about three times as much as the present inventive compositions) to effect similar algae removal and water clarification.

These results demonstrate that the present inventive method and composition provide for the decolorization of water bodies in a significantly improved manner requiring less effort.

What is claimed is:

1. A method for removing algae from a water body comprising establishing in the water body a concentration of EDTA compound of at least about 0.15 ppm and a concentration of ammonium ions up to about 2 ppm and then filtering the water.

2. The method of claim 1, wherein the concentration of EDTA compound is about 0.2-1.0 ppm and the concentration of ammonium ions is about 0.4-2 ppm.

3. The method of claim 2, wherein the concentration of EDTA compound is about 0.3-0.6 ppm and the concentration of ammonium ions is about 0.5-1.1 ppm.

4. The method of claim 3, wherein the water body is a swimming pool having a pH of about 7.7-8.2 and a chlorine concentration above about 0.5 ppm.

5. The method of claim 4, wherein the EDTA compound is selected from the group consisting of EDTA, disodium EDTA, calcium disodium EDTA, trisodium EDTA, tetrasodium EDTA, and mixtures thereof.

6. The method of claim 5, wherein the source of the ammonium ions is ammonium salt selected from the group consisting of ammonium hydroxide ammonium chloride, ammonium sulfate, and mixtures thereof.

7. The method of claim 6, wherein the EDTA compound is disodium EDTA and the ammonium salt is ammonium sulfate.

8. A method for removing algae from a water body comprising adding to the water body abut 8-32 ounces per 20,000 gallons of water of a composition comprising (a) at least about 4 % EDTA compound and (b) about 96 wt.% or less ammonium salt and then filtering the water.

9. The method of claim 8, wherein the water body is a swimming pool having a pH of about 7.7-8.2 and a chlorine concentration above about 0.5 ppm.

10. The method of claim 9, wherein the EDTA compound is selected from the group consisting of EDTA, disodium EDTA, calcium disodium EDTA, trisodium EDTA, tetrasodium EDTA, and mixtures thereof.

11. The method of claim 10, wherein the ammonium salt is selected from the group consisting of ammonium hydroxide, ammonium chloride, ammonium sulfate, and mixtures thereof.

12. The method of claim 11, wherein the EDTA compound is disodium EDA and the ammonium salt is ammonium sulfate.

13. The method of claim 12, wherein the composition comprises about 5-50 wt.% disodium EDTA and about 80-95 wt.% ammonium sulfate.

14. The method of claim 13, wherein the composition comprises about 10wt.% disodium EDTA and about 90% ammonium sulfate.

* * * * *